UNITED STATES PATENT OFFICE.

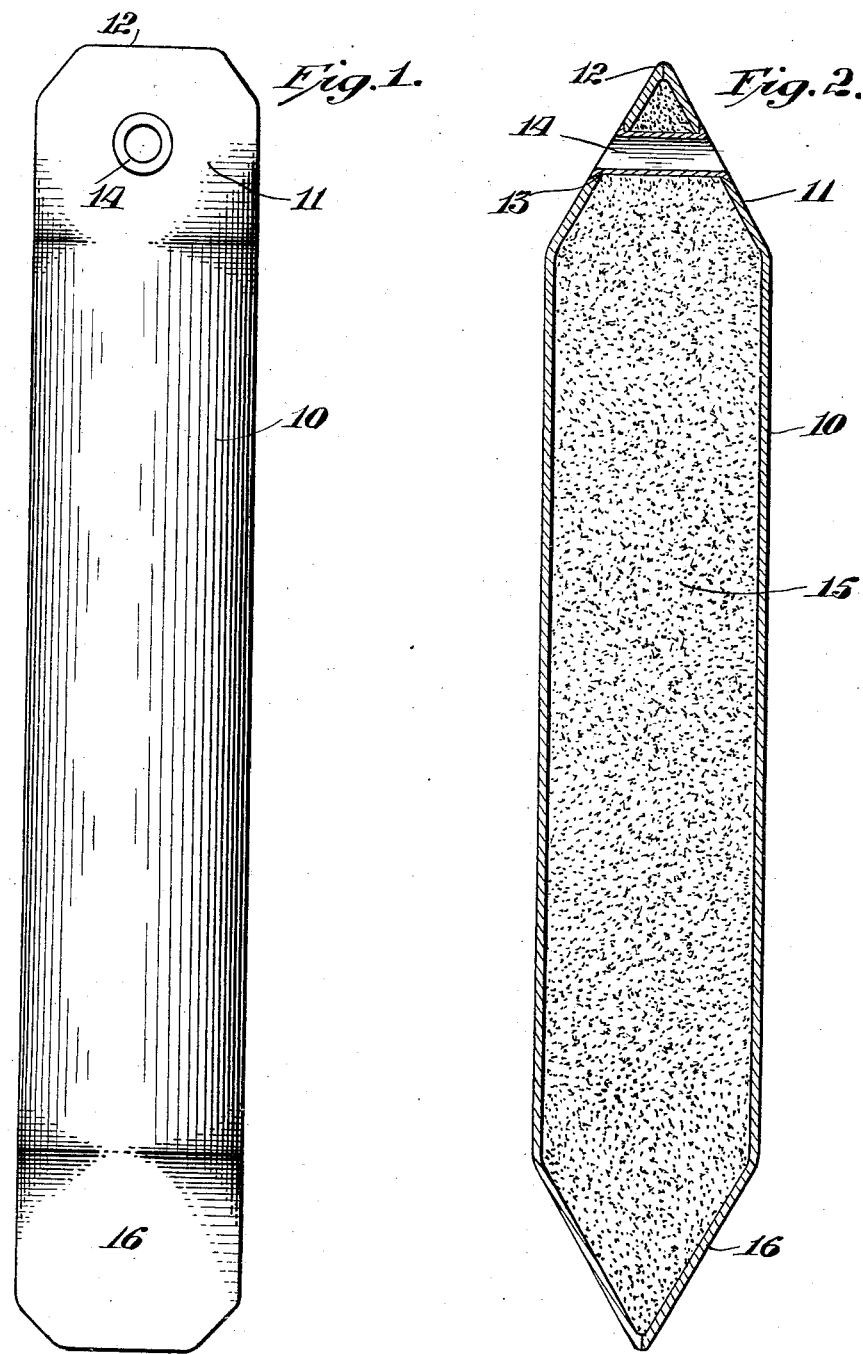

CHARLES E. POPE, OF PITTSBURG, PENNSYLVANIA.

BALANCE-WEIGHT.

No. 863,638.     Specification of Letters Patent.     Patented Aug. 20, 1907.

Application filed November 23, 1906. Serial No. 344,691.

*To all whom it may concern:*

Be it known that I, CHARLES E. POPE, a citizen of the United States, and a resident of Pittsburg, county of Allegheny, State of Pennsylvania, have invented certain new and useful Improvements in Balance-Weights, of which the following is a specification accompanied by drawings.

My invention relates to tubular balance weights such as are commonly used to counterpoise window sashes, and for similar purposes.

Its object is to produce a weight which shall be of substantially the same specific gravity as the ordinary cast iron weight, but of smoother exterior surface, and less frangible, as well as more economical in manufacture.

In the drawings, Figure 1 is an elevation of the sash weight embodying my invention, and Fig. 2 is a vertical section of the same.

To make a sash weight according to the present invention, I take a piece of wrought iron or steel tubing 10 of the proper length and diameter for the required weight, and draw in its upper end, as by hammering, to form a tapered head 11, the head being entirely closed at its tip 12. I then transversely pierce the head 11 to form an aperture 13, into which I insert the short piece of tubing or eyelet 14, the ends of which are suitably bent and hammered to form a tight joint on each side of the tapered head 11. Through the eyelet 14 a suitable cord or chain can be inserted for the purpose of suspending the weight. I then fill the body 10 of the weight with a mass 15 of suitable heavy filler, which may be of iron ore dust, pulverized scale or heavy cinder. The lower end or bottom 16 of the weight is then closed in a similar manner to the head 11. The top and bottom are then suitably finished by clipping off any projections that may happen to remain after the ends have been closed, thereby giving the top and bottom of the weight a finished appearance, as shown in Fig. 1.

It will be seen that the insertion of the eyelet 14 will effectively close the transversely pierced hole in the head 11 and prevent any of the filler from leaking out, as is often the case when the head of the weight is simply flattened and then pierced without the insertion of a suitable eyelet. The eyelet also provides a suitable bearing surface for the cord or chain that passes through the same, as it provides ample bearing surface and leaves no sharp corners or rough edges which wear the cord or chain.

I have filed other applications for balance weights, Serial Nos. 321,132, 321,133, 321,134 and 321,135, formed with wrought tubular bodies, and showing different methods of closing the upper and lower ends thereof. As these closures of the upper and lower ends are independent of each other, it is obvious that they are to a certain extent interchangeable, that is, that the indrawn head of the present application might be used with the form of bottom closure shown in either of the other applications.

It is of course obvious that I do not herein claim anything claimed in any of said applications.

What I claim and desire to secure by Letters Patent is:—

1. A balance weight comprising a tubular body formed with indrawn tapered ends and provided with a transversely pierced head containing an eyelet.

2. A balance weight comprising a tubular body formed with an indrawn tapered transversely pierced head provided with an eyelet and a closed end.

In testimony whereof I have signed this specification in the presence of two subscribing witnesses.

CHARLES E. POPE.

Witnesses:
   JOHN F. KRAFT,
   JAMES S. DOUTHITT.